United States Patent [19]

Kim et al.

[11] 4,334,925

[45] Jun. 15, 1982

[54] COMBINED CARBURIZATION AND SULFURIZATION/DESULFURIZATION OF MOLYBDENUM-RICH MATTE

[75] Inventors: Jonathan J. Kim, Chelmsford; John F. Elliott, Winchester, both of Mass.

[73] Assignee: Kennecott Corporation, Stamford, Conn.

[21] Appl. No.: 216,680

[22] Filed: Dec. 15, 1980

[51] Int. Cl.³ ............................................. C22C 33/00
[52] U.S. Cl. ....................................... 75/133.5; 75/24
[58] Field of Search ........................... 75/133.5, 23, 24

[56] References Cited

U.S. PATENT DOCUMENTS

| | | | |
|---|---|---|---|
| 2,135,630 | 11/1938 | Sullivan et al. | 75/133.5 |
| 3,857,699 | 12/1974 | Ammann et al. | 75/24 |
| 3,857,700 | 12/1974 | Ammann et al. | 75/74 |
| 4,001,011 | 1/1977 | Agarwal et al. | 75/24 |

Primary Examiner—M. J. Andrews
Attorney, Agent, or Firm—John L. Sniado; Anthony M. Lorusso

[57] ABSTRACT

Molten molybdenum-copper-iron-sulfur mattes or alloys, obtained, for example, by reacting slags or other copper-molybdenum containing oxide residues or waste materials witn an iron and/or sulfide reductant, are enriched in molybdenum and copper by a pyrometallurgical process. The molten matte or alloy material is first carburized whereupon a copper-rich matte phase separates from the alloy phase and is removed. The molten alloy phase is next treated one or more times by the addition of sulfur or pyrite resulting in the formation of additional copper-rich matte as a separate phase which is separated after each treatment, leaving an alloy of molybdenum and iron of reduced Cu content. Finally the alloy is desulfurized to provide a commercial product.

12 Claims, 4 Drawing Figures

COMBINED CARBURIZATION AND SULFURIZATION/DESULFURIZATION OF MOLYBDENUM-RICH MATTE

BACKGROUND OF THE INVENTION

Often, slags or other metallic residues produced in smelting operations contain molybdenum in concentrations sufficient to provide an economic incentive for its recovery. This is particularly true of various copper smelting slags. Generally, the molybdenum present in the slag is due to inefficiencies in the flotation step for separating molybdenite from copper sulfide minerals prior to the smelting step. (Other slags such as steel slags may also contain molybdenum.)

Analysis of some typical copper reverberatory slags shows that the molybdenum is dissolved throughout the glassy iron silicate phase. Standard selective leaching processes cannot be used to recover and isolate the metal values in these slags because the iron silicate is inert to dilute acids and caustic solutions. Concentrated caustics and acids will dissolve the slag with an uneconomical consumption of reagent.

An extraction process to concentrate molybdenum from slags has been described in U.S. Pat. No. 3,857,699 to Paul R. Ammann et al. entitled "Process for Recovering Non-Ferrous Metal Values from Reverberatory Furnace Slags" the teachings of which are incorporated herein by reference. An important step in that process utilizes the preferential solubility of molybdenum in an iron-sulfur matte. Thus, the molybdenum in the molten slag is extracted into a molten iron sulfide matte from which it is recovered.

As is taught in that patent, after oxidizing (roasting) the matte, final recovery of the molybdenum is accomplished hydrometallurgically by leaching the matte to produce a pregnant liquor and then selectively extracting the molybdenum values from the pregnant liquor.

A major disadvantage of hydrometallurgical recovery processes is that the cost per pound of molybdenum becomes high when the matte or alloy contains low concentrations of molybdenum (e.g., less than 10%).

SUMMARY OF THE INVENTION

Accordingly, an object of the present invention is to provide an economical process for upgrading molybdenum mattes or alloys.

Another object of this invention is to use relatively low cost pyrometallurgical carburization, decopperization and desulfurization, under controlled conditions, to concentrate the molybdenum in alloys. The concentrated or enriched molybdenum alloy may be refined further into a finished or salable molybdenum product either by hydrometallurgical processing or by further pyrometallurgical treatment if needed.

The foregoing and other objects are accomplished by the pyrometallurgical process of the present invention wherein the molybdenum in the molten matte (and/or alloy), derived for example from the aforementioned prior art slag treatment process, is enriched by successive carburization, decopperization and desulfurization treatments. In each carburization and decopperization stage, a copper-rich matte separates from the molten alloy as a separate liquid phase. The copper-rich sulfide matte is transferred to smelting or converting vessels for the copper recovery.

In accordance with the overall process of the present invention, a desulfurized molybdenum-rich iron alloy and a copper sulfide matte are recovered. The first step in the overall recovery process is conventional, e.g., generally in accordance with the teachings of U.S. Pat. No. 3,857,699, and separates a material containing molybdenum, copper, iron and sulfur from a slag. The metal phase (alloy or matte) recovered from the slag is then subjected to the successive carburization, decopperization and desulfurization treatments that characterize the present invention. In the carburization step, carbon is added causing a copper-sulfur phase to separate more easily from the molybdenum-rich alloy. After the lighter copper-sulfur phase is skimmed or decanted off, sulfur or pyrite is injected into the molten alloy phase causing an additional copper matte phase to form which is likewise removed. The sulfur addition and copper-sulfur phase removal steps are repeated, as is necessary, to reduce the copper content of the remaining molybdenum-enriched alloy phase to a desired level. Finally, the decopperized molybdenum alloy is desulfurized to provide one end product of the process, the copper-sulfur material gathered from the preceding steps being another end product. The major advantages of the present process over the known prior art processes include improved economics which is the result of utilizing the molten matter or alloy directly as a liquid, and of the relatively low cost of reagents, energy and operating labor.

It is stressed that this invention describes a process for securing molybdenum-rich materials in an economical manner from a molybdenum-rich alloy (and/or matte) which in turn may have been produced from a slag or other oxidic material. The refinement of the end products into elemental copper and molybdenum or other utilization of the end products of this process may be accomplished by methods well known to the metallurgical arts.

DESCRIPTION OF THE PREFERRED EMBODIMENTS

As used herein the term "matte" connotes a predominantly sulfide material while the term "alloy" connotes a predominantly metallic material which may contain small amounts of sulfur. In the carburization and sulfurization steps of the present invention, the liquid phase separation which occurs results in formation of a sulfide matte as the lighter phase and molybdenum enriched alloy as the heavier phase. As used in this specification and claims, all percents are by weight unless otherwise specified.

At the outset the process of the present invention is described in its broadest overall aspects with a more detailed description following. The present invention is a pyrometallurgical process for treatment of molten mattes or alloys containing non-ferrous metal values such as molybdenum and copper which are treated to form separate copper-rich mattes and molybdenum-enriched alloys without loss of these metal values. Such mattes usually are obtained after extracting the molybdenum and copper in molten smelter slags into an iron sulfide reductant as is described in U.S. Pat. No. 3,857,699 to produce a molybdenum containing alloy or matte. Of course, the source for producing the matte or alloy may be other oxidic molybdenum bearing materials such as fumes and dusts from smelting operations.

It should be noted that the phase formation reactions of the present invention concentrate the molybdenum values in an alloy phase by successive removal of copper and sulfur. Of course the copper-rich sulfide mattes which separate from the molybdenum-enriched alloy during the process represent a product of commercial value for its copper content.

(a) OXIDIC MATERIAL TREATMENT

As was previously noted, the first step in the overall process for the recovery of metal values from the oxidic material is conventional and may involve treatment of slag or other oxidic material with an iron-sulfur reductant generally in accordance with the teachings of U.S. Pat. No. 3,857,699. In this stage, temperature and matte concentration ranges are chosen at which molybdenum is soluble in an iron-sulfur matte in preference to the slag. To obtain relatively high distribution coefficients, the iron or sulfur mole ratio in the matte is maintained between about two or one to nine to one with a matte containing a mole ratio of iron to sulfur of about two to one to three to one being preferred, and the temperature is maintained between the range of temperatures of the slag melting point (about 1050° C.) and 1600° C. The preferred temperature range for the system is between 1200° C. to 1375° C. In connection with the foregoing, the distribution coefficient of molybdenum is defined as the ratio of molybdenum concentration in the matte to the molybdenum concentration in the slag in a single stage.

Figure 1:
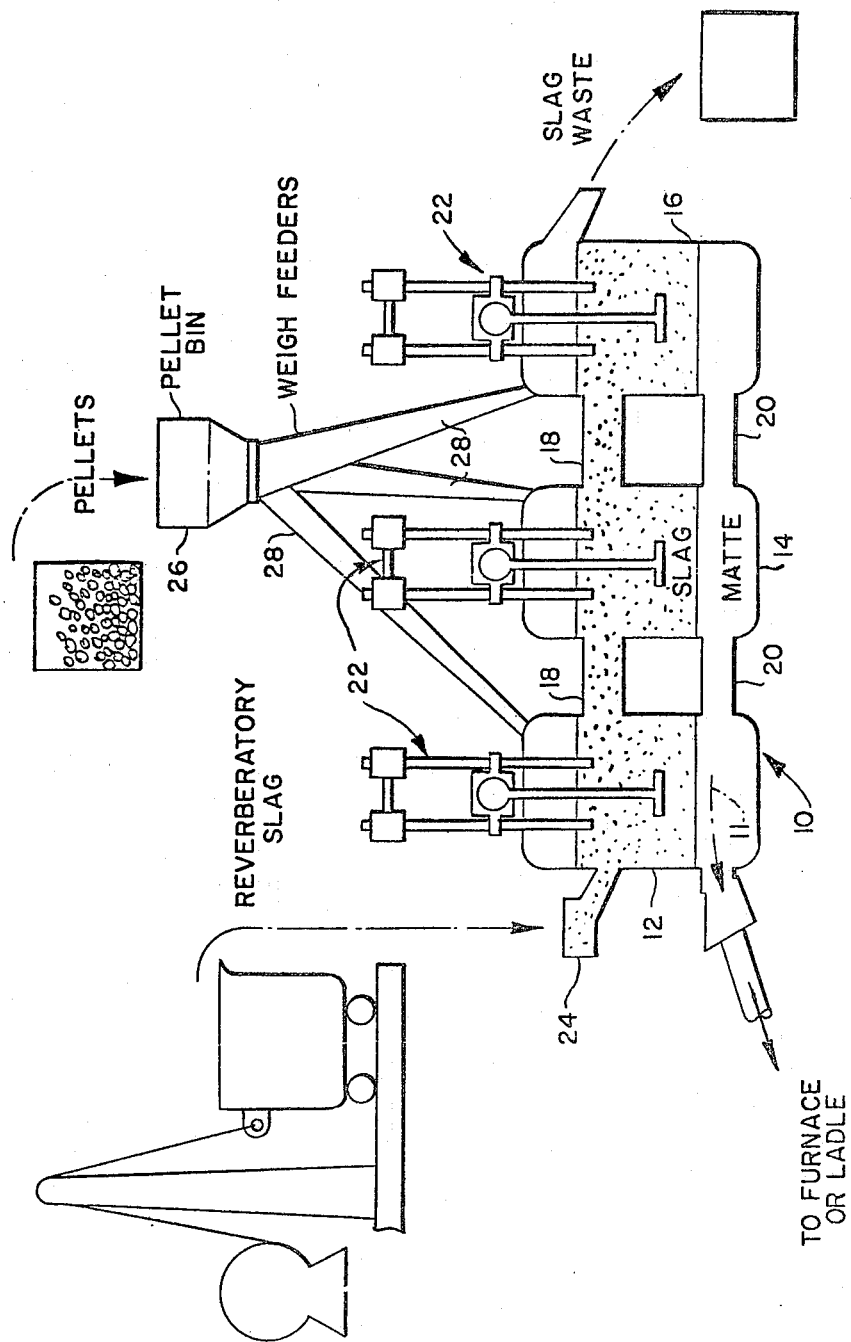
FIG. 1 is a schematic representation of a process for treating an oxidic material to produce matte.

The slag and the matte may be reacted with each other batchwise in a single reactor or in a counter-current manner in a multistage reactor. The embodiment of the present invention wherein slag and matte contact each other in a counter-current manner is best shown in FIG. 1. To accomplish such counter-current contact, a multistage reactor 10 is used. Although three reactors 12, 14 and 16 are shown in FIG. 1, as is apparent, two reactors can be utilized, or, indeed, more than three reactors can be utilized. Reactors 12, 14 and 16 are connected in series by upper and lower conduits 18 and 20. As is shown in FIG. 1, lower conduits 20 allow a flow of matte from one reactor to another; whereas, upper conduits 18 allow a flow of slag from one reactor to another. It is preferably to stir the contents of the reactor with a stirrer assembly 22. Stirrer assembly 22 may be a water cooled mechanical stirrer having copper blades as is shown in U.S. Pat. No. 3,857,699. It is emphasized, however, that the particular scheme used to increase contact between the slag and the matte forms no part of the invention. For example, the matte may be agitated into the slag by injecting a neutral gas such as nitrogen into each reactor by means of a lance.

Slag is introduced into slag treatment reactor 10 by being poured into a launder 24 located on reactor 12. Other constituents in reactor 10, such as iron pyrites, iron and sulfur, are added to reactor 10 by means of a feed bin 26 which has launders 28 which distribute materials to reactors 12, 14 and 16. The three slag treatment reactors 12, 14 and 16 connected in series were determined to provide products with high molybdenum contents and overall process flexibility. To handle 66 tons per hour based on slag feed rates, each unit 12, 14 and 16 must be able to contain 22 tons of slag. Each reactor 12, 14 and 16 holds a maximum of 15 tons of matte product. The matte is generated continuously in each furnace, and once each shift, the matte is tapped off from first reactor 12 into which the slag is fed. Only half of the matte is tapped at any one time.

As is set forth above, the slag treatment product can contain molybdenum, copper and other non-ferrous metal values. To recover these values, the slag treatment product, represented by arrow 11, is drawn off separately from the slag and is delivered to a furnace or ladle to upgrade its molybdenum and copper content.

At this point, it should be noted that alloys or mattes which can be treated in accordance with the present invention are obtainable from sources other than the slag treatment procedure described above. As mentioned above, dusts containing oxidic molybdenum can be used to produce mattes which are treatable by the present process. By carburizing, decopperizing (sulfidizing), and desulfurdizing mattes or alloys having molybdenum and iron, the metallic content of the material is enriched no matter what the source of the matte or alloy might be. Such mattes or alloys are usually produced from many types of slags. Typically, the slags are ferrosilicate slags. High magnetite slags, that is slags containing 7 to 30% by weight magnetite, can be treated to produce a matte which in turn can be treated in accordance with the present invention to recover its molybdenum content. However, it is necessary to reduce the magnetite content of such slags prior to molybdenum extraction. Ideally, such high magnetite slags would be treated in accordance with the process set forth in U.S. Pat. No. 3,857,700 entitled Pyrometallurgical Recovery of Copper Values from Converter Slags by Ammann et al in order to remove much of the copper content of such slags. In practicing the process of that patent, the teachings of which are incorporated herein by reference, such high magnetite slags are contacted while molten with a reductant. The reductant reduces the iron oxide in the slag, thus lowering the magnetite content which in turn enables the copper in the slag to be extracted into a sulfide matte. Thus, the slag, after being treated in accordance with the procedure set forth in that patent, has a low magnetite content that is below 5% by weight and has much of its copper content removed.

In accordance with the present invention, the composition range for the oxide starting material is set forth below.

TABLE I

| Constituent | Percent by Weight |
|---|---|
| FeO | 40–60 |
| $Fe_3O_4$ | (5–30) as part of FeO |
| $SiO_2$ | 20–38 |
| CaO | 0 to 5 |
| MgO | 0 to 5 |
| $Al_2O_3$ | 0 to 10 |
| Cu | trace (0.05) to 10 |
| Mo | trace (0.05) to 3 |
| S | 0 to 3 |
| impurities | 0 to 5 |

In more general terms, the process is applicable to slags or metallic oxide materials which contain 0.05–3% molybdenum, 0.05–10% copper, and the remainder being comprised of FeO, Fe₃O₄, SiO₂, CaO, MgO, Al₂O₃, S, and impurities such as arsenic, lead and zinc.

After treatment of the slag with the iron-sulfur reductant a matte is produced which has the following composition:

TABLE II

| Constituent | Percent by Weight |
| --- | --- |
| Mo | 1–30 |
| Cu | 1–20 |
| S | 2–15 |
| impurities | 0–5 |
| Fe | balance |

It is preferred, however, to produce mattes having the following composition:

TABLE III

| Constituent | Percent by Weight |
| --- | --- |
| Mo | 10–25 |
| Cu | 1–25 |
| S | 2–10 |
| impurities | 0–2 |
| Fe | balance |

(b) CARBURIZATION

As is set forth above, after separating the matte from the slag, in accordance with the procedures set forth in U.S. Pat. No. 3,857,699, the matte and/or alloy is delivered in molten state or in granulated form to a furnace or ladle where carbon is pneumatically injected, e.g., by nitrogen, into the molten molybdenum-copper alloy and/or matte. During carbon injection the temperature of the matte is maintained at least at 1300° C., preferably 1400° to 1420° C.

As a result of this reaction with carbon, two distinct liquid phases form and separate into (1) a copper-sulfur matte constituting the lighter phase and (2) a low melting molybdenum-iron alloy constituting the heavier layer. The carbon is practically insoluble in the lighter or matte phase. The copper-sulfur matte will typically contain about 15–30 wt. % Cu and may be granulated and processed for recovery of the copper.

Any suitable carbon source may be used for carburization including, for example, coal, coke or graphite. The carbon source is added in an amount sufficient to provide phase separation and preferably in an amount sufficient to provide from about 2 wt. % to about 4 wt. % carbon in the alloy phase. Most preferably, the alloy phase is saturated with carbon, i.e., at about 4 wt. % carbon.

After carburization the alloy phase will generally have the following composition:

| Constituent | Percent by Weight |
| --- | --- |
| Cu | 0.9–5 |
| Mo | 1.0–35 |
| S | 0.5–5.0 |
| C | 2.5–4 |
| Fe | balance |

(c) DECOPPERIZATION (SULFURIZATION)

Elemental sulfur or pyrite is pneumatically injected into the carburized molten alloy preferably at 1330–1350° C. Again a sulfide phase (copper sulfide matte) separates on top of the molten alloy phase and is decanted or skimmed off. In this manner the copper concentration in the alloy phase is decreased to a target concentration of <0.5 wt. percent. The sulfurization treatment typically produces a 5–15 percent grade copper matte, which is decanted and granulated. This granulated product may also be processed for recovery of the copper contained therein.

Figure 3:
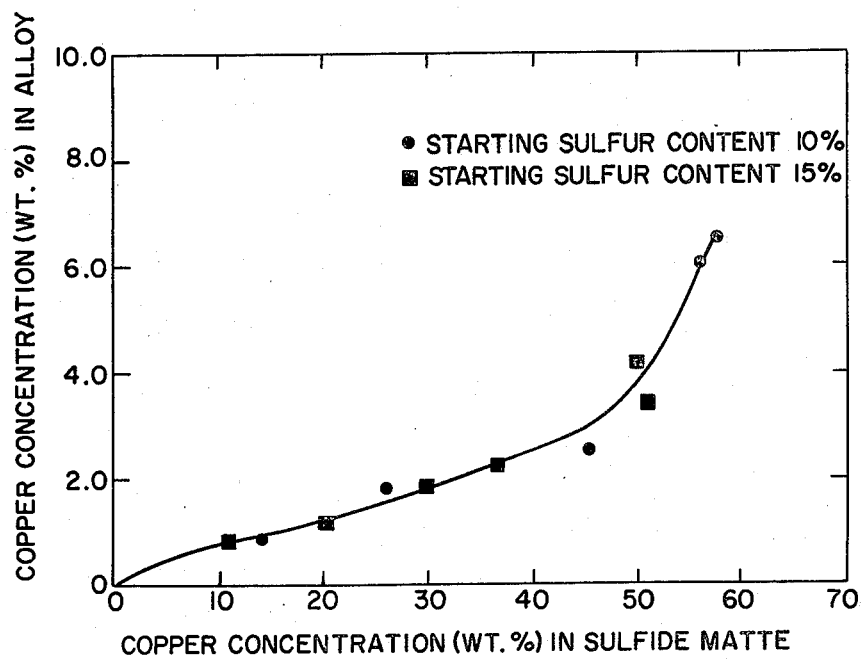
FIG. 3 is a graph showing copper partition between sulfide mattes and molybdenum alloys.

When particulate pyrite is used as the sulfur source, during injection the pyrite particles will be decomposed into molten FeS and sulfur vapor. As the sulfur content increases, copper dissolved in the molybdenum-iron alloy will migrate to the sulfide matte at a rate dependent, in part, on the copper concentration of the matte. Accordingly, in order to reach the target concentration of 0.5 wt. % Cu or less in the alloy phase, the steps of separating the copper rich sulfide phase and the addition of the sulfurizing agent may be repeated one or more times. Copper partition between sulfide mattes and molybdenum alloys is shown in FIG. 3.

The decopperized alloy phase will typically have the following composition:

| Constituent | Percent by Weight |
| --- | --- |
| Mo | 1–35 |
| Cu | 0.1–0.5 |
| S | 0.5–5 |
| C | 2.0–4 |
| Fe | balance |

(d) DESULFURIZATION

After reduction of the copper content of the molybdenum-iron alloy to a desired level, the remaining, upgraded alloy is then desulfurized. Desulfurization may be accomplished by oxidizing the sulfur and removing it as SO₂ gas. However it is preferred to chemically combine the sulfur with other desulfurizing agents to prevent oxidation of the metal values. For this purpose a desulfurizing agent is pneumatically injected into the molten alloy to reduce sulfur to a target concentration of 0.01 wt. percent. Suitable desulfurizing agents include magnesium, coke, calcium carbide, lime and mixtures thereof.

It is important to completely remove any molten sulfide matte from the reactor before starting the desulfurization step.

Preferably the melt is maintained at 1300°–1350° C. during desulfurization.

After desulfurization the iron-moly alloy product is granulated, dried and subsequently packaged.

A typical alloy product will have the following composition:

| Constituent | Percent by Weight |
| --- | --- |
| Mo | 5–50 |
| Cu | 0.1–0.5 |
| S | 0.01–0.03 |
| C | 2.5–4.0 |
| Fe | balance |

Figure 2:
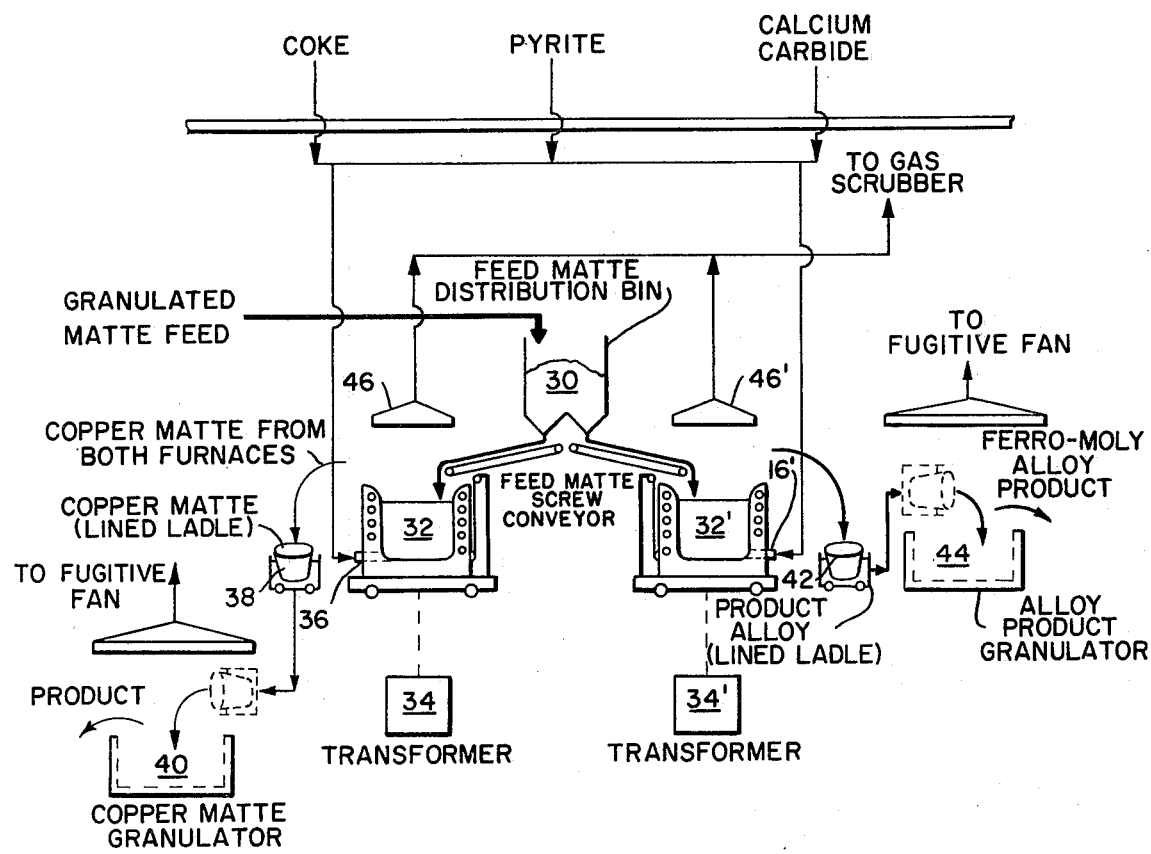
FIG. 2 is a schematic representation of the process for enriching the molybdenum content of an alloy or matte in accordance with the present invention.

A typical embodiment of the overall process will now be described with reference to FIG. 2. A granulated feed matte obtained from slag as described in connection with FIG. 1 (Mo 21.05%; Cu 10.53% Fe 56.85%; and S 11.57%) is fed from hopper 30 into coreless-type electric induction furnaces 32 and 32'. Induction furnaces 32 and 32' are powered from 10,000 kw tranformers 34 and 34', respectively. Alternatively, ladles each arranged in parallel with an arc furnace may be used instead of the electric induction furnaces.

Petroleum coke is then pneumatically injected into the molten matte held at a temperature of 1400° C. through tuyeres 36 and 36' in the bottom of the furnaces 32 and 32'. The coke, as well as chemical additives used in the subsequent steps is injected using 100 SCFM nitrogen as the injection gas at 0.67 lb/SCF density. Coke is injected until the alloy phase is saturated with carbon at 4.0 wt. percent. After the alloy and copper matte phases are separated completely, the 26.77 wt. % copper grade matte is decanted into a ladle 38 and transferred to copper matte granulator 40. The granulated copper matte is sent to the smelter to recover the copper.

The remaining Mo alloy phase (30.10% Mo; 3.0% Cu; 63.15% Fe; 1.87% C; 1.87% S) is decopperized by injecting pyrite through tuyeres 36 and 36' using 100 SCFM nitrogen as an injection gas. The percentage of copper is lowered from 3.0 wt. % to 0.35 wt. % in the alloy phase. After the alloy and copper matte phases are separated completely, the Cu matte is decanted into the copper matte ladle 38, granulated (or cast), and sent to the smelter to recover the copper.

The remaining Mo alloy (Mo 30.59 wt. %; 0.35% Cu; 63.42% Fe; 1.55% S; 4.00% C) is desulfurized by injecting calcium carbide with $N_2$. All but trace amounts of sulfur in the alloy are removed. After desulfurization, the 30.86 wt. % moly product is decanted into a 125 ft$^3$ product ladle 42, and transferred to product granulator 44.

Process gas containing about 8 percent $SO_2$ at a 1000 SCFM flow rate is emitted during the decopperization process. These gases and particulate-bearing process gases from the carburization and desulfurization steps are collected by process hoods 46 and 46' and are sent to a limestone scrubbing system.

The final product produced by the process of the present invention is a ferro-molybdenum material which may be sold directly. Of course, if desired, the product can be treated to produce low carbon ferro-molybdenum or other chemical forms of molybdenum.

Process Flowsheet

Figure 4:
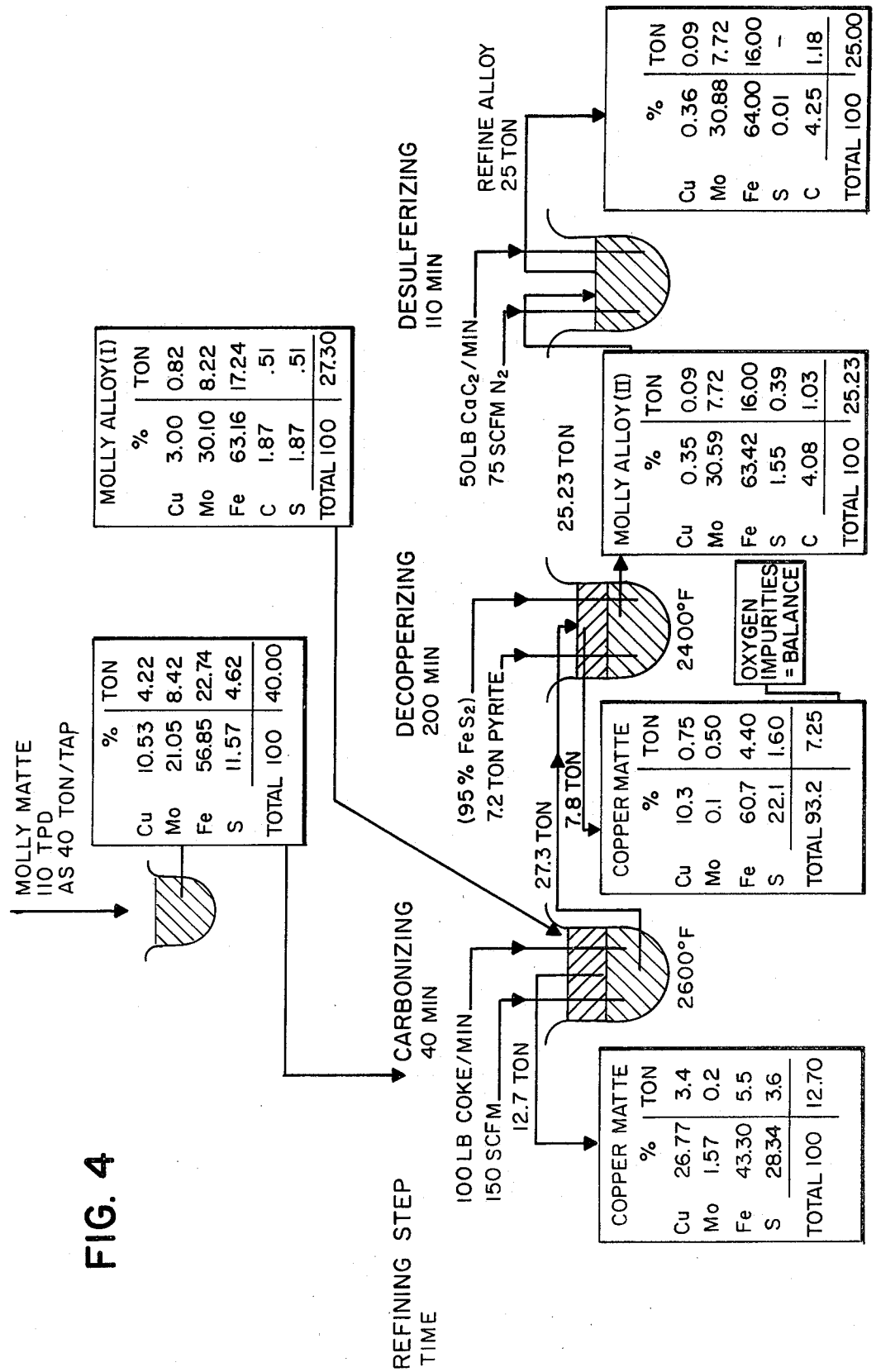
FIG. 4 is a material balance of the process showing the three main processing steps of the present invention.

A simplified flow diagram (FIG. 4) illustrates the three main process steps with material balances:

carburization—saturates the alloy phase with carbon to target concentration of about approximately a 4 wt. percent, decopperization—sulfur as pyrite is added to lower the copper concentration in the alloy phase to less than 0.5 wt. percent, desulfurization—calcium carbide is added to remove sulfur from the ferro-moly product to less than 0.05 wt. percent. One hundred ten tons per day of matte from the stirred electric furnace containing about 21 wt. percent molybdenum is fed from a wet matte storage bin, through a dryer, and ultimately conveyed into a 300 ft$^3$ clamshell bucket. The clamshell bucket is picked up by a 30 ton bridge crane and dumped into a 1500 ft$^3$ feed matte distribution bin. The process is started by feeding an amount of dry matte from the feed matte distribution bin to fill up two 30 ton furnaces with granulated matte. A spare 30 ton furnace is kept on-line in the process area and can take over for either operating furnace in the event of failure, or regularly scheduled maintenance. After melting the matte, the density of the molten matte is approximately twice the bulk density of the dry matte. Therefore, the molten matte now occupies one-half the volume of both furnaces. Additional dry matte is fed to fill up both furnaces again for melting. This charge/melt operation is repeated until both furnaces are full. Chemical additives are injected through a pneumatic feed system through a tuyere situated in the bottom of each furnace. Each furnace, including the spare, has an independent injection system for each additive required.

Petroleum coke is injected into the molten matte to lower the equilibrium concentration of sulfur and copper in the alloy phase. The molten matte is carburized by injecting petroleum coke from a 200 ft$^3$ petroleum coke injection tank. All chemical additives are injected using 100 SCFM nitrogen as the injection gas at 0.67 lb/SCF density. Coke is injected until the alloy phase is saturated with carbon. After the alloy and copper matte phases are separated completely, the copper matte is decanted into a 100 ft$^3$ ladle and transferred on a ladle car/tilter to copper matte granulation. The granulated copper matte is sent to the smelter to recover the copper. Additional dry matte is fed to both furnaces and the previous operations are repeated until the daily throughput of granulated feed matte has been melted and carburized.

The remaining Mo alloy phase is decopperized by injecting pyrite from 250 ft$^3$ pyrite injection tanks using 100 SCFM nitrogen as an injection gas. The percentage of copper is lowered to less than 0.5 wt % in the alloy phase. After the alloy and copper matte phases are separated completely, the Cu matte is decanted into the copper matte ladle, granulated (or cast), and sent to the smelter to recover the copper.

The remaining Mo alloy is desulfurized by injecting calcium carbide with $N_2$ from the 450 ft$^3$ calcium carbide injection tank. All but trace amounts of sulfur in the alloy are removed. After desulfurization, the moly product is decanted into a 125 ft$^3$ product ladle, and transferred on a ladle car/tilter to product granulation. The wet, granulated product is dried in the convection dryer and transferred to the packaging section.

The fumes and particulate emissions which are produced during the melting, decanting and granulation processes are collected in fugitive hoods and discharged at roof level.

Process gas containing 8 percent $SO_2$ at a 1000 SCFM flow rate is emitted during the decopperization process (84 min/day). These gases and particulate-bearing process gases from the carburization and desulfurization steps are sent to a limestone scrubbing system.

The invention may be embodied in other specific forms without departing from the spirit or essential characteristics thereof. The present embodiments are therefore to be considered in all respects as illustrative and not restrictive; the scope of the invention being indicated by the appended claims rather than by the foregoing description, and all changes which come within the meaning and range of equivalency of the claims are therefore intended to be embraced therein.

We claim:

1. A pyrometallurgical process for recovering a molybdenum-rich alloy from an oxidic material containing molybdenum, copper and iron oxide, the recovery process comprising:

(a) reacting the molten oxidic material with an iron-sulfur reductant to cause a phase separation whereby an iron-molybdenum-copper-sulfur material forms as it separates from the remainder of the oxidic material which forms a slag;

(b) separating the iron-molybdenum-copper-sulfur material from the remaining slag phase;

(c) adding carbon to the molten iron-molybdenum-copper-sulfur material to cause a liquid phase separation and to produce a first copper-rich sulfide matte as the upper liquid phase and a molybdenum-enriched alloy as the lower liquid phase;

(d) separating the first copper rich sulfide matte from the molybdenum enriched alloy phase;

(e) adding sulfur or an iron-sulfide reductant to the molten molybdenum-enriched alloy phase formed in c) to cause liquid phase separation and to produce a second copper-rich sulfide matte as the upper liquid phase and a molybdenum-enriched alloy as the lower liquid phase;

(f) separating the second copper-rich sulfide matte from the molybdenum-enriched alloy phase; and (g) desulfurizing the molybdenum-enriched alloy to produce the molybdenum-rich iron alloy product.

2. The process as set forth in claim 1 wherein in step (g) the molybdenum-rich iron alloy is desulfurized by adding a desulfurizing agent.

3. The process of claim 1 wherein steps (e) and (f) are repeated at least once before proceding to step (g).

4. The process of claim 3 wherein steps (e) and (f) are repeated until the copper content of the alloy phase is reduced to 0.5 wt. % Cu or less.

5. The process of claim 1 wherein the carbon added in (c) is the form of graphite, coal or coke.

6. The process of claim 1 or 5 wherein the amount of carbon added in (c) is sufficient to provide from about 2 wt. % to about 4 wt. % carbon in the alloy phase.

7. The process of claim 1 or 5 wherein the carbon is added in (c) in an amount sufficient to saturate the alloy phase.

8. The process of claim 7 wherein the temperature of the molten alloy to which the carbon is added is at least 1350° C.

9. The process of claim 2 wherein said desulfurizing agent is selected from the group consisting of magnesium, coke, calcium carbide, lime and mixtures thereof.

10. The process of claim 1 wherein reaction step (a) is conducted in multiple stages with countercurrent flow.

11. A process for producing a molybdenum product from an oxidic material containing molybdenum values comprising the following steps:

(a) selecting a slag that has the following composition:

| Constituent | Percent by Weight |
|---|---|
| FeO | 40–60 |
| Fe$_3$O$_4$ | (5–30) as part of FeO |
| SiO$_2$ | 20–38 |
| CaO | 0 to 5 |
| MgO | 0 to 5 |
| Al$_2$O$_3$ | 0 to 10 |
| Cu | trace (0.05) to 10 |
| Mo | trace (0.05) to 3 |
| S | 0 to 3 |
| impurities | 0 to 5 |

(b) reacting the slag of step (a) with carbonaceous reductants, said reaction being performed at a temperature between the slag melting point and 1600° C.;

(c) separating a molten matte or alloy as a reaction product from the reaction of step (b), said matte having the following composition:

| Constituent | Percent by Weight |
|---|---|
| Mo | 1–30 |

-continued

| Constituent | Percent by Weight |
|---|---|
| Cu | 1–20 |
| S | 2–15 |
| impurities | 0–5 |
| Fe | balance |

(d) delivering said matte product of step (c) to a ladle or furnace and injecting carbon into the matte in said ladle or furnace while it is molten at a temperature of at least 1350° C. to cause separation of a copper-sulfur matte phase and a carbon-saturated molybdenum alloy phase having the following composition:

| Constituent | Percent by Weight |
|---|---|
| Cu | 0.9–5 |
| Mo | 1.0–35 |
| S | 0.5–5 |
| C | 2.5–4 |
| Fe | balance |

(e) separating the copper-sulfur matte phase;

(f) adding sulfur or an iron-sulfur reductant to the molten molybdenum alloy formed in (d), at a temperature of 1330°–1350° C., to cause separation of additional copper-sulfur matte from the molybdenum alloy, removing the matte and repeating sulfur addition and matte removal to produce an alloy phase containing:

| Constituent | Percent by Weight |
|---|---|
| Mo | 1–35 |
| Cu | 0.1–0.5 |
| S | 0.5–5 |
| C | 2.0–4 |
| Fe | balance | and, (b) adding desulfurizing agent to the molten alloy formed in (f), at 1300°–1350° C., to remove sulfur and to form an alloy product of the following composition:

| Constituent | Percent by Weight |
|---|---|
| Mo | 5–50 |
| Cu | 0.1–0.5 |
| S | 0.01–0.03 |
| C | 2.5–4 |
| Fe | balance |

12. A pyrometallurgical process for recovering a molybdenum-rich iron alloy from a copper-molybdenum-sulfur (iron) material, the recovery process comprising:

(a) adding carbon to the molten material to cause a liquid phase separation and to produce a first copper-rich sulfide matte as the upper liquid phase and a molybdenum-enriched alloy as the lower liquid phase;

(b) separating the first copper rich sulfide matte from the molybdenum-enriched alloy;

(c) adding sulfur or an iron-sulfide reductant to the molten molybdenum-enriched alloy to cause liquid phase separation and to produce a second copper-rich sulfide matte as the upper liquid phase and a molybdenum-enriched alloy as the lower liquid phase;

(d) separating the second copper-rich sulfide matte from the molybdenum-enriched alloy; and, (e) desulfurizing the molybdenum-enriched alloy to produce the molybdenum-rich iron alloy product.

* * * * *